United States Patent
Matsui et al.

(10) Patent No.: US 10,556,406 B2
(45) Date of Patent: Feb. 11, 2020

(54) LIGHT-SHIELDING BARRIER LAMINATE

(71) Applicant: Dai Nippon Printing Co., Ltd., Tokyo (JP)

(72) Inventors: Shigeki Matsui, Tokyo (JP); Koichi Mikami, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 427 days.

(21) Appl. No.: 14/910,205

(22) PCT Filed: Sep. 16, 2014

(86) PCT No.: PCT/JP2014/074354
§ 371 (c)(1),
(2) Date: Feb. 4, 2016

(87) PCT Pub. No.: WO2015/041199
PCT Pub. Date: Mar. 26, 2015

(65) Prior Publication Data
US 2016/0176166 A1 Jun. 23, 2016

(30) Foreign Application Priority Data
Sep. 17, 2013 (JP) .................. 2013-191856

(51) Int. Cl.
*B32B 27/36* (2006.01)
*B32B 27/32* (2006.01)
(Continued)

(52) U.S. Cl.
CPC .............. *B32B 27/08* (2013.01); *B32B 27/32* (2013.01); *B32B 27/36* (2013.01); *B65D 1/28* (2013.01); *B65D 25/14* (2013.01); *B65D 31/02* (2013.01); *B65D 75/26* (2013.01); *B65D 81/3897* (2013.01); *B32B 2255/10* (2013.01);
(Continued)

(58) Field of Classification Search
CPC ......... B32B 27/08; B32B 27/36; B32B 27/32; B32B 2386/00; B32B 2329/00
See application file for complete search history.

(56) References Cited

FOREIGN PATENT DOCUMENTS

| | | |
|---|---|---|
| JP | 08-318591 | 12/1996 |
| JP | 2003-181972 | 7/2003 |

(Continued)

OTHER PUBLICATIONS

International Search Report of PCT/JP2014/074354, dated Dec. 22, 2014, and English translation thereof, 4 pages total.

*Primary Examiner* — Rip A Lee
(74) *Attorney, Agent, or Firm* — Hamre, Schumann, Mueller & Larson, P.C.

(57) ABSTRACT

To provide a light-shielding barrier laminate with excellent gas barrier properties and light-shielding properties. A light-shielding barrier laminate comprising a light-shielding sealant film laminated on a transparent gas barrier film, having an inorganic oxide vapor deposition film formed on one side of a transparent resin film, on the side on which the inorganic oxide vapor deposition film has been formed, via an adhesive layer, the light-shielding sealant film being a film having an aluminum vapor deposition film formed on one side of a heat-sealable resin film, the side on which the aluminum vapor deposition film is formed being laminated so as to face the adhesive layer.

3 Claims, 2 Drawing Sheets

(51) Int. Cl.
  *B32B 27/08*  (2006.01)
  *B65D 1/28*  (2006.01)
  *B65D 25/14*  (2006.01)
  *B65D 30/08*  (2006.01)
  *B65D 75/26*  (2006.01)
  *B65D 81/38*  (2006.01)
  *B65D 81/30*  (2006.01)
  *B65D 65/16*  (2006.01)

(52) U.S. Cl.
  CPC ..... *B32B 2255/20* (2013.01); *B32B 2255/205* (2013.01); *B32B 2255/26* (2013.01); *B32B 2307/41* (2013.01); *B32B 2307/412* (2013.01); *B32B 2307/7242* (2013.01); *B32B 2439/70* (2013.01); *B32B 2439/80* (2013.01); *B65D 65/16* (2013.01); *B65D 81/30* (2013.01)

(56) References Cited

FOREIGN PATENT DOCUMENTS

| | | | | |
|---|---|---|---|---|
| JP | 2003-181972 A | * | 7/2003 | ............... B32B 9/00 |
| JP | 2005-001753 | | 1/2005 | |
| JP | 2006-051751 | | 2/2006 | |
| JP | 2009-248454 | | 10/2009 | |
| JP | 2011-093195 | | 5/2011 | |

* cited by examiner

LIGHT-SHIELDING BARRIER LAMINATE

TECHNICAL FIELD

The present invention relates to a light-shielding barrier laminate.

BACKGROUND ART

Conventionally, various packaging materials have been developed and proposed for filling and packaging of a variety of articles including foods and beverages, drugs, cosmetics, detergents, chemicals and the like. The most important issue for such packaging materials is to have gas barrier properties against oxygen gas, water vapor and the like. Another issue, particularly for packaging materials for contents that progressively undergo decomposition and deterioration of their components by light, is a requirement for a light-shielding property to shield them from penetration of exterior light. Among such packaging materials in the prior art there have been used three-layer structure laminates, that are obtained by laminating a printed transparent plastic film, an aluminum vapor deposition film or aluminum foil having a gas barrier property and a light-shielding property, and a sealant film (PTL 1).

However, packaging materials made of such three-layer structure laminates, because of their multilayer structures, use large amounts of materials and have thick bulk, leading to problems in terms of production cost, transport cost and the like. In addition, a laminate using an aluminum foil introduces problems such as poor environment stability, and a laminate using an aluminum vapor deposition film has problems of poor gas barrier properties or light-shielding properties, and decomposition or deterioration of contents.

Furthermore, when the contents are powders or granules such as salt, sugar, powdered soup, powdered milk, instant coffee, furikake, powdered or granulated seasonings, powdered detergents or the like, for example, a very high water vapor-barrier property is required in order to maintain the powdered or granular nature of the contents, but conventional packaging materials cannot satisfy this requirement, and quality has been impaired due to moisture absorption by the contents.

CITATION LIST

Patent Literature

[PTL 1] Japanese Unexamined Patent Application Publication HEI No. 9-314735

SUMMARY OF INVENTION

Technical Problem

It is an object of the present invention to solve the problems mentioned above by providing a light-shielding barrier laminate having an excellent gas barrier property and light-shielding property, capable of being produced at low cost without bulk, and exhibiting a water vapor barrier property that is sufficiently high for use as a packaging material for packaging of powders, as well as a package, and particularly a package for powder, that is made from the same.

Solution to Problem

In order to solve the problems described above, the invention provides a light-shielding barrier laminate comprising a light-shielding sealant film laminated on a transparent gas barrier film, having an inorganic oxide vapor deposition film formed on one side of a transparent resin film, on the side on which the inorganic oxide vapor deposition film has been formed, via an adhesive layer, the light-shielding sealant film being a film having an aluminum vapor deposition film formed on one side of a heat-sealable resin film, the side on which the aluminum vapor deposition film is formed being laminated so as to face the adhesive layer, and it has been found that this light-shielding barrier laminate achieves the object stated above.

The present invention has the following features.

1) A light-shielding barrier laminate comprising a light-shielding sealant film laminated on a transparent gas barrier film, having an inorganic oxide vapor deposition film formed on one side of a transparent resin film, on the side on which the inorganic oxide vapor deposition film has been formed, via an adhesive layer, the light-shielding sealant film being a film having an aluminum vapor deposition film formed on one side of a heat-sealable resin film, the side on which the aluminum vapor deposition film is formed being laminated so as to face the adhesive layer.

2) A light-shielding barrier laminate according to 1) above, wherein the aluminum vapor deposition film is formed by a vacuum vapor deposition method with a resistance heating system.

3) A light-shielding barrier laminate according to 1) or 2) above, which is for packaging of a powder.

4) A light-shielding barrier laminate according to any one of 1) to 3) above, wherein the inorganic oxide vapor deposition film is formed by a vacuum vapor deposition method with a resistance heating system.

5) A light-shielding barrier laminate according to any one of 1) to 4), wherein the transparent gas barrier film is a gas-barrier coated film made of a gas barrier composition comprising one or more alkoxides represented by the general formula $R^1_{n}M(OR^2)_m$ (where $R^1$ and $R^2$ are C1 to 8 organic groups, M is a metal atom, n is an integer of 0 or greater, m is an integer of 1 or greater, and n+m is the valency of M), and either or both a polyvinyl alcohol-based resin or an ethylene-vinyl alcohol copolymer, and obtained by polycondensation by a sol-gel method, further formed on the inorganic oxide vapor deposition film.

6) A light-shielding barrier laminate according to any one of 1) to 5) above, wherein the inorganic oxide is an aluminum oxide.

7) A light-shielding barrier laminate according to any one of 1) to 6) above, wherein the heat-sealable resin film is made of two or more olefin-based resin layers.

8) A light-shielding barrier laminate according to 7) above, wherein the heat-sealable resin film is made of two or more olefin-based resin layers, at least one of which contains a polypropylene resin.

Advantageous Effects of Invention

The light-shielding barrier laminate of the invention has a two-layer structure, does not incur extra production cost and transport cost, and exhibits both excellent gas barrier properties and light-shielding properties. The laminate can also be rendered with a small thickness.

Furthermore, the laminate of the invention can have a two-layer structure by forming an aluminum vapor deposition film by a vacuum vapor deposition method using a resistance heating system, on a heat-sealable resin film, to impart a light-shielding property to the sealant film. Particularly, since the vapor deposition is by a resistance heating system, it is possible to densely form an aluminum vapor deposition film with an excellent light-shielding property thereover, without melting the heat-sealable resin film. This is also preferred in terms of the aesthetic quality of the packaging material, since the metallic luster of aluminum is exhibited even without printing. Furthermore, the heat-sealable resin film that is to contact with the contents may be any commonly used one, without any particular restrictions.

Thus, when it is to be applied as a packaging material for packaging of food, chemicals or the like, the film selected for use may be one consisting only of materials conforming to FDA or food hygiene law standards, without coloring agents and the like.

In addition, the laminate of the invention has at least two layers each comprising a dense vapor deposition film laminated on a resin film as the substrate (a transparent resin film and heat-sealable resin film), and can exhibit a high water vapor barrier property allowing its use even as a packaging material for packaging of powders.

In addition, a vacuum vapor deposition method by a resistance heating system not only has a short treatment time and allows the line speed to be increased, but a vapor deposition film obtained by a vapor deposition system also has low static build-up. Consequently, when applied as a package for a powder, the laminate of the invention can prevent problems during working caused by powder adhesion and the like, such as sealing defects, for example.

In addition, by forming on the inorganic oxide vapor deposition film a gas-barrier coated film comprising a gas barrier composition including an alkoxide and a polyvinyl alcohol-based resin or ethylene-vinyl alcohol copolymer, it is possible to further increase the barrier property against oxygen and water vapor.

Moreover, in the laminate of the invention, the heat-sealable resin film may be two or more co-extruded multilayer films instead of a single-layer film, whereby the gas barrier property can be further improved and additional functions such as oil resistance can be imparted to the laminate.

DESCRIPTION OF EMBODIMENTS

The invention will now be explained in greater detail.

The names of the resins used according to the invention are those commonly used in the industry. The "density" for the purpose of the invention is the value measured according to JIS-K7112. Also, the "MFR" is the value measured according to JIS-K7210.

<Multilayer Structure of Light-Shielding Barrier Laminate of the Invention>

Figure 1:
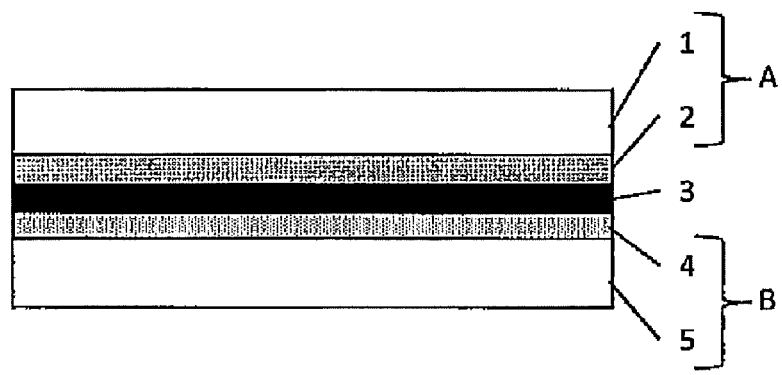
FIG. 1 is a schematic cross-sectional diagram showing an example of the multilayer structure of a light-shielding barrier laminate of the invention.

FIG. 1 is a schematic cross-sectional diagram showing an example of the multilayer structure of a light-shielding barrier laminate of the invention. As shown in FIG. 1, the laminate of the invention comprises a transparent gas barrier film A having an inorganic oxide vapor deposition film 2 formed on one side of a transparent resin film 1, and a light-shielding sealant film B having an aluminum vapor deposition film 4 formed on one side of a heat-sealable resin film 5, being laminated so that the inorganic oxide vapor deposition film 2 and the aluminum vapor deposition film 4 face each other via an adhesive layer 3.

Figure 2:
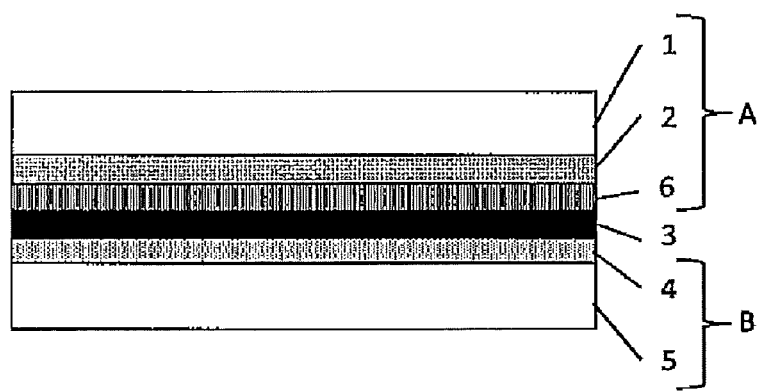
FIG. 2 is a schematic cross-sectional diagram showing another example of the multilayer structure of a light-shielding barrier laminate of the invention.

As shown in FIG. 2, a gas-barrier coated film 6 is further provided on the inorganic oxide vapor deposition film 2. By providing the gas-barrier coated film 6 it is possible to increase the gas barrier property and weather resistance.

Figure 3:
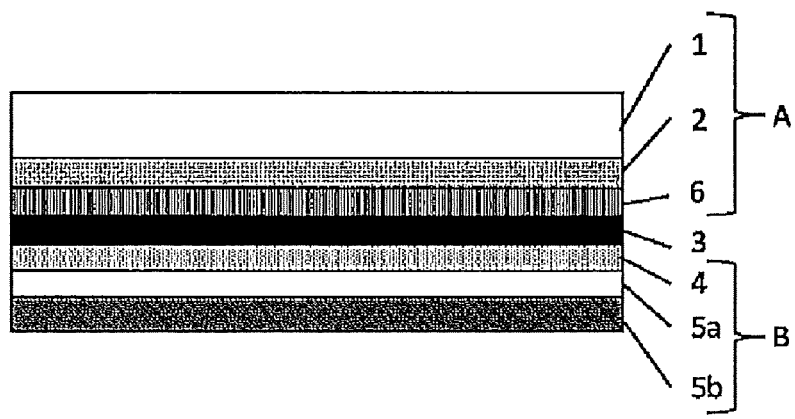
FIG. 3 is a schematic cross-sectional diagram showing another example of the multilayer structure of a light-shielding barrier laminate of the invention.

Furthermore, the heat-sealable resin film 5 may be a co-extruded multilayer film of two layers 5a, 5b, as shown in FIG. 3. For example, one of the two layers, for example, the layer 5a formed on the aluminum vapor deposition film, may be a layer made of high-density polyethylene and the layer 5b on the side on which the heat seal side is to be formed may be a layer made of an olefin-based resin that exhibits the desired seal strength, in order to further increase the oxygen gas barrier property and water vapor barrier property while maintaining the desired seal strength.

While not shown, the heat-sealable resin film 5 may also be a co-extruded multilayer film of 3 or more layers. For example, at least one of the layers, such as an intermediate layer, may be a layer made of polypropylene while the other layer is a layer made of an olefin-based resin that exhibits the desired seal strength, in order to increase the oxygen gas barrier property and water vapor barrier property while maintaining the desired seal strength and lamination strength, and to also impart oil resistance to the laminate of the invention.

When the laminate of the invention is to be printed with characters, images or the like, such may be done on any desired side of the transparent resin film 1, and for example, by previously printing on the side of the transparent gas barrier film A facing the adhesive layer 3, using a reverse printing system, it is possible to form a printed image without impairment by surface friction or the like. In this case, before the reverse printing is carried out, a protective film made of a primer coat resin may be provided on the side of the transparent gas barrier film A which is to be printed.

The laminate of the invention may have any desired thickness according to the purpose of use and the desired seal strength, gas barrier property, etc.

<Transparent Resin Film>

In the laminate of the invention, the transparent resin film used may be any desired resin film that maintains the desired strength, heat resistance, transparency and other properties, depending on the purpose of use of the package. Specifically, there may be used a film of a resin such as a polyester-based resin, polyamide-based resin, polyaramid-based resin, polyolefin-based resin, polycarbonate-based resin, polystyrene-based resin, polyacetal-based resin, fluorine-based resin or the like. A polyethylene terephthalate (PET) film is particularly preferred for the invention for reasons of suitability for printing, suitability for vapor deposition, antistatic properties in vapor deposition, and the like.

The resin film used may be either an unstretched film, or a stretched film obtained by stretching in a uniaxial direction or biaxial direction. The thickness of the film may be determined as appropriate by a person skilled in the art depending on the purpose of use of the package, but it will generally be 5 to 100 μm.

Also, the surface on the side of the transparent resin film opposite the side on which the inorganic oxide vapor deposition film is to be formed, there may be provided another layer, as desired, such as an optional printed image layer or a surface protective layer to protect it.

<Inorganic Oxide Vapor Deposition Film>

By forming an inorganic oxide vapor deposition film on one side of the transparent resin film, it is possible to obtain a transparent gas barrier film in the laminate of the invention.

The material used to form the inorganic oxide vapor deposition film may be one having transparency, and a gas barrier property against oxygen, water vapor and the like, with examples including oxides such as silicon oxide, aluminum oxide, magnesium oxide, calcium oxide, zirconium oxide, titanium oxide, boron oxide, hafnium oxide and barium oxide, among which aluminum oxide, silicon oxide and magnesium oxide are particularly preferred from the viewpoint of gas barrier property and production efficiency.

The inorganic oxide vapor deposition film may be composed of a monolayer formed by a single vapor deposition step, or it may have a multilayer structure formed by several repeated vapor deposition steps. In the case of a multilayer structure, each layer may consist of the same material or of different materials, and may be formed by the same method or by different methods.

The thickness of the inorganic oxide vapor deposition film may be appropriately set within a range of 5 to 100 nm and more preferably 10 to 50 nm, as the overall thickness of the film.

Exceeding 100 nm is undesirable because the flexibility may be reduced and cracks may be generated in the vapor deposition film under external force such as bending or stretching after film formation, the transparency may be reduced, the stress of the material itself may increase, and coloration may result. A thickness exceeding 100 nm is also undesirable because productivity will be significantly reduced and protrusions will tend to form by growth of aberrant particles.

If the film thickness is less than 5 nm, on the other hand, the transparency will be satisfactory but it will be difficult to obtain a homogeneous layer and the gas barrier property function will not be easily exhibited in a sufficient manner.

The method of forming the vapor deposition layer may be, for example, a physical vapor deposition method such as vacuum vapor deposition, sputtering or ion plating, or a chemical vapor deposition method such as plasma chemical vapor deposition, thermochemical vapor deposition or photochemical vapor deposition.

According to the invention, a vapor deposition system is preferred for vacuum vapor deposition, and a resistance heating system, induction heating system, electron beam heating system or the like may be selected as necessary and appropriate for use.

Particularly when the laminate of the invention is to be used as a package for powder, for use for packaging of, for example, powdered or granular food, or a detergent, it is preferred to form the inorganic oxide vapor deposition film by vacuum vapor deposition with a resistance heating system. Vacuum vapor deposition with a resistance heating system involves heating the vapor deposition material by Joule heat using an electrical resistor, and because it allows overall heating it allows formation of a more homogeneous vapor deposition film compared to other heating systems, and the line speed can be set to a faster speed.

Furthermore, a resistance heating system minimizes static electrification of the film, preventing adhesion of powder onto the film and preventing sealing defects and the like, and is therefore particularly suitable for the laminate of the invention. In addition, forming an aluminum oxide vapor deposition film by vacuum vapor deposition using a resistance heating system is particularly preferred for the invention from the viewpoint of antistatic properties, gas barrier properties, transparency and cost.

<Gas-Barrier Coated Film>

According to the invention, by further providing a gas-barrier coated film such as described below on the inorganic oxide vapor deposition film, it is possible not only to obtain more excellent gas barrier properties, but also to increase contact bondability with the adhesive layer and obtain even higher gas barrier properties.

According to the invention, a gas-barrier coated film is a film that is formed by coating a gas barrier composition obtained by polycondensation of an alkoxide and a water-soluble polymer by a sol-gel method.

The alkoxide used for the gas barrier composition may be one or more types of alkoxide represented by the general formula $R^1{}_nM(OR^2)_m$ (where $R^1$ and $R^2$ each represent a C1-8 organic group, M represents a metal atom, n represents an integer of 0 or greater, m represents an integer of 1 or greater, and n+m represents the valency of M).

Also, the water-soluble polymer is preferably a polyvinyl alcohol-based resin or ethylene-vinyl alcohol copolymer, or both.

According to the invention, the alkoxide represented by the general formula $R^1{}_{nM}(OR^2)_m$ may employ silicon, zirconium, titanium, aluminum or the like as the metal atom M. Also according to the invention, alkoxides of one or more different metal atoms may be used in admixture in the same solution.

Specific examples of organic groups represented by $R^1$ in an alkoxide represented by the general formula $R^1{}_{nM}(OR^2)_m$ include methyl, ethyl, n-propyl, i-propyl, n-butyl, i-butyl, sec-butyl, t-butyl, n-hexyl, n-octyl, and other alkyl groups.

Specific examples of organic groups represented by $R^2$ in an alkoxide represented by the general formula $R^1{}_{nM}(OR^2)_m$ include methyl, ethyl, n-propyl, i-propyl, n-butyl, sec-butyl, and other alkyl groups.

According to the invention, these alkyl groups may be the same or different in the same molecule.

The alkoxide represented by the general formula $R^1{}_{nM}(OR^2)_m$ according to the invention may be, for example, an alkoxysilane where M is Si, examples of alkoxysilanes including tetramethoxysilane $Si(OCH_3)_4$, tetraethoxysilane $Si(OC_2H_5)_4$, tetrapropoxysilane $Si(OC_3H_7)_4$ and tetrabutoxysilane $Si(OC_4H_9)_4$.

Also according to the invention, the content of the polyvinyl alcohol and/or ethylene-vinyl alcohol is preferably in the range of 5 to 500 parts by mass with respect to 100 parts by mass as the total of the alkoxide. If the content exceeds 500 parts by mass, the brittleness of the formed gas-barrier coated film will undesirably increase.

According to the invention, the polyvinyl alcohol used may generally be one obtained by saponification of polyvinyl acetate. Specific examples of polyvinyl alcohols include PVA110 (saponification degree=98-99%, polymerization degree=1100), PVA117 (saponification degree=98-99%, polymerization degree=1700), PVA124 (saponification degree=98-99%, polymerization degree=2400) and PVA135H (saponification degree=99.7%, polymerization degree=3500) by Kuraray Co., Ltd., the RS polymer RS-110 (saponification degree=99%, polymerization degree=1,000) and KURARAY POVAL LM-20SO (saponification degree=40%, polymerization degree=2,000) by the same manufacturer, and GOHSENOL NM-14 (saponification degree=99%, polymerization degree=1,400) and GOHSENOL NH-18 (saponification degree=98-99%, polymerization degree=1700) by Nippon Synthetic Chemical Industry Co., Ltd.

According to the invention, the ethylene-vinyl alcohol used may be a saponification product of a copolymer of ethylene and vinyl acetate, i.e. one obtained by saponification of an ethylene-vinyl acetate random copolymer. Such saponification products include partial saponification products having several tens of mol % of residual acetic acid groups, and complete saponification products having only a few mol % of residual acetic acid groups or having absolutely no residual acetic acid groups. While this is not particularly restrictive, from the viewpoint of gas barrier properties it is preferred to use one with a saponification degree of preferably 80 mol % or greater, more preferably 90 mol % or greater and even more preferably 95 mol % or greater.

Also, it is preferred to use one wherein the content of ethylene-derived repeating units in the ethylene-vinyl alcohol (hereunder also referred to as "ethylene content") is generally 0 to 50 mol % and preferably 20 to 45 mol %. Specific examples of such ethylene-vinyl alcohols include EVAR EP-F101 (ethylene content: 32 mol %) by Kuraray Co., Ltd., and SOARNOL D2908 (ethylene content: 29 mol %) by Nippon Synthetic Chemical Industry Co., Ltd.

According to the invention, a commonly used silane coupling agent or the like may be added to prepare the gas barrier composition to be used to form the gas-barrier coated film.

The gas barrier composition to be used for the invention may be prepared by hydrolysis of an alkoxide and a water-soluble polymer by a sol-gel method in the presence of an acid, water and an organic solvent, followed by polycondensation.

The gas-barrier coated film may be formed by coating a gas barrier composition onto the inorganic oxide vapor deposition film, and conducting heat treatment at a temperature of 20° C. to 200° C. and preferably 100° C. or higher, and no higher than the melting point of the transparent resin film, for a period of between 10 seconds and 10 minutes.

Examples for acids to be used for preparation of the gas barrier composition include mineral acids such as sulfuric acid, hydrochloric acid and nitric acid, and organic acids such as acetic acid and tartaric acid, as well as other acids.

Examples of organic solvents that may be used include methyl alcohol, ethyl alcohol, isopropyl alcohol and n-propyl alcohol.

The polyvinyl alcohol and/or ethylene-vinyl alcohol for the gas barrier composition is preferably in a state dissolved in a coating solution containing an alkoxide or silane coupling agent, and the type of organic solvent is appropriately selected for this purpose.

According to the invention, the ethylene-vinyl alcohol that has been solubilized in the solvent may be a commercially available product such as SOARNOL (product of Nippon Synthetic Chemical Industry Co., Ltd.), for example.

The gas barrier composition is coated on the inorganic oxide vapor deposition film and heated to remove the solvent and the alcohol produced by polycondensation reaction, thereby completing the polycondensation reaction and forming a transparent gas-barrier coated film.

Furthermore, contact bondability between the vapor deposition film and gas-barrier coated film is satisfactory due to bonding between the hydroxyl groups produced by hydrolysis or silanol groups from the silane coupling agent, with hydroxyl groups on the surface of the vapor deposition film.

<Protective Film Made of Primer Coat Resin>

Depending on the case, a protective film made of a primer coat resin may be formed on the surface of the transparent gas barrier film on the side facing the adhesive layer, or in other words, on the inorganic oxide vapor deposition film or the gas-barrier coated film. When reverse printing is carried out on a transparent gas barrier film, a protective film can prevent abrasion with the roll during the printing step and deterioration of the barrier property by white ink.

There are no particular restrictions on the primer coat resin used for the invention, and for example, the main component of the vehicle may be a resin such as a polyurethane-based resin, polyester-based resin, polyamide-based resin, epoxy-based resin, phenol-based resin, polyvinyl acetate-based resin, vinyl-vinyl chloride acetate copolymer, acid-modified polyolefin-based resin, (meth)acrylic-based resin, polybutadiene-based resin or rubber-based compound, or its prepolymer or monomer, either alone as one type or a mixture of more than one types. The primer coat resin may be coated onto the sterile oxide vapor deposition film or gas-barrier coated film and dried to form a protective film.

<Light-Shielding Sealant Film>

According to the invention, the light-shielding sealant film is a film having an aluminum vapor deposition film formed on one side of a heat-sealable resin film.

According to the invention, the heat-sealable resin film may be a commonly used heat-sealable resin film that can be melted by heat and fused. It is most preferably one containing no slip agent. Also, it is preferably one that does not produce blocking before or after vapor deposition by vacuum vapor deposition with a resistance heating system. More preferably, it is one with transparency.

Specifically, it may be a film having the aforementioned properties, and composed of low-density polyethylene, medium-density polyethylene, high-density polyethylene, linear low-density polyethylene, polypropylene, ethylene-vinyl acetate copolymer, an ionomer resin, ethylene-ethyl acrylate copolymer, ethylene-acrylic acid copolymer, ethylene-methacrylic acid copolymer, ethylene-propylene copolymer, methylpentene polymer, an acid-modified polyolefin-based resin obtained by modifying a polyolefin-based resin such as polyethylene or polypropylene with an unsaturated carboxylic acid such as acrylic acid, methacrylic acid, maleic anhydride or fumaric acid, or a resin mixture comprising one or more of these resins.

The heat-sealable resin film may also be a multilayer film of two or more layers. For example, it may be a multilayer film comprising two or more olefin-based resin layers.

According to the invention, the aluminum vapor deposition film formed on the heat-sealable resin film may be formed by vacuum vapor deposition using a resistance heating system. A resistance heating system produces no radiant heat and allows uniform heating of the vapor deposition material. Thus, it is possible to form a dense aluminum vapor deposition film with an excellent light-shielding property and aesthetic gloss, without melting the heat-sealable resin film.

Also, when the laminate of the invention is to be used as a package for a powder, it is necessary to use vacuum vapor deposition by a resistance heating system in order to minimize static electrification of the film.

<Production of Laminate>

According to the invention, the transparent gas barrier film and the light-shielding sealant film are laminated with their vapor deposition film-formed sides facing each other, thereby allowing production of a light-shielding barrier laminate of the invention.

The lamination may be carried out by attachment through an adhesive layer, using dry lamination. In this case, the adhesive used to form the adhesive layer may be selected from among commonly used ones, according to the purpose of use. Specifically, these include polyvinyl acetate-based adhesives, polyacrylic acid ester-based adhesives, cyano acrylate-based adhesives, ethylene copolymer-based adhesives, cellulosic adhesives, polyester-based adhesives, polyamide-based adhesives, polyimide-based adhesives, amino resin-based adhesives, phenol resin-based adhesives, epoxy-based adhesives, polyurethane-based adhesives, reactive (meth)acrylic-based adhesives, rubber-based adhesives, silicone-based adhesives, and the like, with no limitation to these.

Also, the aforementioned two films may be attached by extrusion lamination (sandwich lamination). In such cases, the adhesive resin used to form the adhesive layer may be a polyolefin-based thermal bonding resin, for example, a simple substance such as LDPE, or an ethylene-methacrylic acid copolymer, ethylene-acrylic acid copolymer, ionomer or the like, or a resin that is a blend thereof with an adhesion improver such as a hard resin.

According to the invention, the layer thickness (coating amount) of the adhesive layer is preferably about 0.1 to 10 g/m$^2$ (in a dry state).

<Package>

The light-shielding barrier laminate of the invention is preferably used as a packaging material, such as a packaging bag. For example, the laminate of the invention is folded in two, or two laminates are prepared and overlayed so that their heat-sealable resin film sides face each other, and the surrounding edges are heat sealed in a heat sealing form such as a side seal, two-way seal, three-way seal, four-way seal, envelope seal, butt-seam seal (pillow seal), folded seal, flat-bottom seal, square-bottom seal or gauzette, to produce various forms of packaging bags.

The method of heat sealing may be a known method such as bar sealing, revolving roll sealing, belt sealing, impulse sealing, high-frequency sealing or ultrasonic sealing.

The light-shielding barrier laminate of the invention has an excellent oxygen gas barrier property, water vapor barrier property and light-shielding property, and can be produced at low cost without bulk. Thus, it may be suitably used as a packaging material for various purposes.

In particular, it may be suitably used for packaging of substances that tend to undergo decomposition or deterioration by light or oxygen gas. In addition, it is most preferably used for packaging of different types of powders, since it exhibits a high water vapor barrier property and generates low static electricity during production.

EXAMPLES

The invention will now be explained in greater detail by examples.

Example 1

(1) A plasma treatment side was formed on one side of a 12 μm-thick biaxially stretched PET film, using a magnetron sputtering apparatus with argon gas. The obtained film was mounted in a resistance heating-type vacuum vapor deposition apparatus, and a 20 nm-thick aluminum oxide vapor deposition film was formed on the plasma treated side, under the following vapor deposition conditions.
(Vapor Deposition Conditions)
Vapor deposition source: Aluminum
Source gas: oxygen
Degree of vacuum in vapor deposition chamber: $2\times10^{-4}$ mbar
Degree of vacuum in take-up chamber: $2\times10^{-2}$ mbar
Inline OD value: 0.2
Film transport speed: 600 m/min Next, a plasma treatment side was formed in the same manner as above on the formed aluminum oxide vapor deposition film.

(2) Separately, using the compositions listed in Table 1 below, to a prepared mixture comprising composition (a): polyvinyl alcohol, acetic acid, isopropyl alcohol and ion-exchanged water, there was added a previously prepared hydrolysate of composition (b): Ethyl silicate 40, isopropyl alcohol, aluminum acetylacetone, hydrochloric acid and ion-exchanged water, and the mixture was stirred to obtain a colorless transparent gas barrier composition.

TABLE 1

| | | |
|---|---|---|
| a. | Polyvinyl alcohol | 1.24 mass % |
| | Isopropyl alcohol | 20.1 mass % |
| | H$_2$O | 43.8 mass % |
| | Acetic acid | 0.10 mass % |
| b. | Ethyl silicate 40 (product of Colcoat Co., Ltd.) | 9.26 mass % |
| | Isopropyl alcohol | 8.88 mass % |
| | Aluminum acetylacetone | 0.02 mass % |
| | Hydrochloric acid | 0.10 mass % |
| | H$_2$O | 16.5 mass % |
| | Total | 100 mass % |

The previously prepared gas barrier composition was then coated onto the plasma treated side formed in (1) above by gravure roll coating, and heat treated at 100° C. for 30 seconds to form a gas-barrier coated film with a thickness of 0.4 g/m$^2$ (dry state), to produce a transparent gas barrier film.

(3) Separately, to 100 parts by weight of ethylene-1-hexene copolymer having a density of 0.920, polymerized using a metallocene-based catalyst, there was added 0.5 part by weight of zeolite having a particle size of 3.5 μm, as an anti-blocking agent, the mixture was thoroughly kneaded, and an inflation film formation method was used to form a film, producing a low-density polyethylene-based resin film with a thickness of 50 μm.

One side thereof was subjected to corona treatment, and the obtained film was mounted in a resistance heating-type vacuum vapor deposition apparatus, forming a 40 nm-thick aluminum vapor deposition film on the corona-treated side under the following vapor deposition conditions, to produce a light-shielding sealant film.
(Vapor Deposition Conditions)
Vapor deposition source: Aluminum
Degree of vacuum in vapor deposition chamber: $2\times10^{-3}$ mbar
Degree of vacuum in take-up chamber: $3\times10^{-2}$ mbar
Film transport speed: 350 m/min (4) Next, after forming a desired printed pattern on the gas-barrier coated film side of the transparent gas barrier film produced in (2) above, a two-pack curable polyurethane-based dry lamination adhesive was coated over the entire surface including the printed pattern using a gravure roll coating method, to a thickness of 4.0 g/m$^2$ (dry state) to form an adhesive layer, and on this adhesive layer, the light-shielding sealant film obtained in (3) above was layered and dry-laminated with the aluminum vapor deposition film side facing, to produce a light-shielding barrier laminate of the invention.

(5) The final multilayer structure was: PET film/aluminum oxide vapor deposition film/gas-barrier coated film/ adhesive layer/aluminum vapor deposition film/low-density polyethylene-based resin film. The total weight of the laminate was 66.2 g/m².

(6) The laminate obtained as described above was evaluated by the following methods for oxygen gas barrier property, water vapor barrier property, resistance to contents and LCA (life cycle assessment).
(Oxygen Gas Barrier Property)

The oxygen permeability was measured using an OXTRAN by Mocon, U.S.A., under conditions with a temperature of 23° C. and a humidity of 90% RH.
(Water Vapor Barrier Property)

The water vapor permeability was measured using an PERMATRAN by Mocon, U.S.A., under conditions with a temperature of 40° C. and a humidity of 90% RH.
(Resistance to Contents)

Two laminates were prepared and attached with their heat-sealable resin film sides facing each other and subjected to three-way heat sealing to produce a three-way seal package bag having the opening above. Next, commercially available contents (powder instant coffee or powder corn soup) were filled into it through the opening, and the opening was heat sealed to produce a package sample.

The obtained sample was allowed to stand at 60° C. for 3 days or outdoors for 1 week, and the change in outer appearance of the contents was observed.
(LCA)

The energy consumption and carbon dioxide emission were calculated using the value of the laminate of Comparative Example 1 described below as 100. The range measured was from the starting material preparation stage to the production stage, using "JEMAI-LCA-Pro" software by Japan Environmental Management Association For Industry, for the calculation.

(7) The evaluation results showed an oxygen permeability of 0.1 cc/m²·day·atm and a water vapor permeability of 0.2 g/m²·day·atm.

Also, no change in outer appearance of contents was found for either the coffee or corn soup as contents, even after standing at 60° C. for 3 days and outdoors for 1 week.

In addition, the energy consumption was 74 and the carbon dioxide emission was 60, with the values for the laminate of Comparative Example 1 as 100.

Example 2

A light-shielding barrier laminate of the invention was produced in the same manner as Example 1, except that in the transparent gas barrier film described in Example 1, no gas-barrier coated film was laminated on the aluminum oxide vapor deposition film.

The final multilayer structure was: PET film/aluminum oxide vapor deposition film/adhesive layer/aluminum vapor deposition film/low-density polyethylene-based resin film.

The evaluation results showed an oxygen permeability of 0.7 cc/m²·day·atm and a water vapor permeability of 0.5 g/m²·day·atm.

Also, no change in outer appearance of contents was found for either the coffee or corn soup as contents, even after standing at 60° C. for 3 days and outdoors for 1 week.

Example 3

A light-shielding barrier laminate of the invention was produced in the same manner as Example 1, except that in the transparent gas barrier film described in Example 1, instead of a gas-barrier coated film there was formed a protective film by coating an acrylic primer coat on the aluminum oxide vapor deposition film.

The final multilayer structure was: PET film/aluminum oxide vapor deposition film/protective film/adhesive layer/aluminum vapor deposition film/low-density polyethylene-based resin film.

The evaluation results showed an oxygen permeability of 0.7 cc/m²·day·atm and a water vapor permeability of 0.5 g/m²·day·atm.

Also, no change in outer appearance of contents was found for either the coffee or corn soup as contents, even after standing at 60° C. for 3 days and outdoors for 1 week.

Example 4

To 100 parts by weight of ethylene-1-octene copolymer having a density of 0.935, polymerized using a metallocene-based catalyst, there was added 0.5 part by weight of zeolite having a particle size of 3.5 µm, as an anti-blocking agent, the mixture was thoroughly kneaded, and an inflation film formation method was used to form a film, producing a medium-density polyethylene-based resin film with a thickness of 50 µm, and one side thereof was subjected to corona treatment.

A light-shielding barrier laminate according to the invention was produced in the same manner as Example 1, except that in the light-shielding barrier laminate of Example 1, the medium-density polyethylene-based resin film described above was used instead of the low-density polyethylene-based resin film.

The final multilayer structure was: PET film/aluminum oxide vapor deposition film/gas-barrier coated film/adhesive layer/aluminum vapor deposition film/medium-density polyethylene-based resin film.

The evaluation results showed an oxygen permeability of 0.1 cc/m²·day·atm and a water vapor permeability of 0.1 g/m²·day·atm.

Also, no change in outer appearance of contents was found for either the coffee or corn soup as contents, even after standing at 60° C. for 3 days and outdoors for 1 week.

In addition, the energy consumption was 75 and the carbon dioxide emission was 63, with the values for the laminate of Comparative Example 1 as 100.

Example 5

To 100 parts by weight of ethylene-propylene random copolymer having a density of 0.900 there was added 0.5 part by weight of zeolite having a particle size of 3.5 µm, as an anti-blocking agent, the mixture was thoroughly kneaded, and an inflation film formation method was used to form a film, producing a polypropylene resin film with a thickness of 50 µm, and one side thereof was subjected to corona treatment.

A light-shielding barrier laminate according to the invention was produced in the same manner as Example 1, except that in the light-shielding barrier laminate of Example 1, the polypropylene resin film described above was used instead of the low-density polyethylene-based resin film.

The final multilayer structure was: PET film/aluminum oxide vapor deposition film/gas-barrier coated film/adhesive layer/aluminum vapor deposition film/polypropylene resin film.

The evaluation results showed an oxygen permeability of 0.1 cc/m²·day·atm and a water vapor permeability of 0.1 g/m²·day·atm.

Also, no change in outer appearance of contents was found for either the coffee or corn soup as contents, even after standing at 60° C. for 3 days and outdoors for 1 week.

In addition, the energy consumption was 76 and the carbon dioxide emission was 62, with the values for the laminate of Comparative Example 1 as 100.

Example 6

To 100 parts by weight of ethylene-1-hexene copolymer having a density of 0.920, polymerized using a metallocene-based catalyst, there was added 0.5 part by weight of zeolite having a particle size of 3.5 µm, as an anti-blocking agent, and the mixture was thoroughly kneaded.

The low-density polyethylene resin composition obtained in this manner and high-density polyethylene with a density of 0.961 were loaded into a multilayer inflation molding machine, a multilayer film with a thickness of 50 µm was produced comprising 10 µm low-density polyethylene layer/ 30 µm high-density polyethylene layer/10 µm low-density polyethylene layer, and one surface thereof was subjected to corona treatment.

A light-shielding barrier laminate according to the invention was produced in the same manner as Example 1, except that in the light-shielding barrier laminate of Example 1, the multilayer film described above was used instead of the low-density polyethylene-based resin film.

The final multilayer structure was: PET film/aluminum oxide vapor deposition film/gas-barrier coated film/adhesive layer/aluminum vapor deposition film/multilayer film (low-density polyethylene layer/high-density polyethylene layer/ low-density polyethylene layer). The obtained laminate exhibited an excellent oxygen gas barrier property and water vapor barrier property.

Also, no change in outer appearance of contents was found for either the coffee or corn soup as contents, whether after standing at 60° C. for 3 days or outdoors for 1 week.

Example 7

To 100 parts by weight of ethylene-1-hexene copolymer having a density of 0.920, polymerized using a metallocene-based catalyst, there was added 0.5 part by weight of zeolite having a particle size of 3.5 µm, as an anti-blocking agent, and the mixture was thoroughly kneaded.

The low-density polyethylene resin composition obtained in this manner and random polypropylene with a density of 0.900 were loaded into a multilayer inflation molding machine, a multilayer film with a thickness of 50 µm was produced comprising 10 µm low-density polyethylene layer/ 30 µm high-density polypropylene layer/10 µm low-density polyethylene layer, and one surface thereof was subjected to corona treatment.

A light-shielding barrier laminate according to the invention was produced in the same manner as Example 1, except that in the light-shielding barrier laminate of Example 1, the multilayer film described above was used instead of the low-density polyethylene-based resin film.

The final multilayer structure was: PET film/aluminum oxide vapor deposition film/gas-barrier coated film/adhesive layer/aluminum vapor deposition film/multilayer film (low-density polyethylene layer/high-density polypropylene layer/low-density polyethylene layer).

The obtained laminate exhibited an excellent oxygen gas barrier property and water vapor barrier property.

Also, no change in outer appearance of contents was found for either the coffee or corn soup as contents, whether after standing at 60° C. for 3 days or outdoors for 1 week.

Comparative Example 1

One side of the PET film used in Example 1 was subjected to corona treatment, and a printed pattern was formed on the corona-treated side, in the same manner as Example 1. Also, one side of the low-density polyethylene-based resin film used in Example 1 was subjected to corona treatment.

On the printed pattern-formed side of the PET film there was formed an adhesive layer in the same manner as Example 1, and an aluminum foil with a thickness of 7 am was dry-laminated over it. On the aluminum foil there was formed an adhesive layer by coating a two-pack curable polyurethane-based dry lamination adhesive to a thickness of 4.0 g/m$^2$ (dry state) in the same manner, and on the adhesive layer side there was attached and dry-laminated the aforementioned low-density polyethylene-based resin film with the corona-treated side facing it, to produce a light-shielding barrier laminate.

The final multilayer structure was: PET film/adhesive layer/aluminum foil/adhesive layer/low-density polyethylene-based resin film.

The evaluation results showed an oxygen permeability of 0.1 cc/m$^2$·day·atm and a water vapor permeability of 0.1 g/m$^2$·day·atm.

Also, no change in outer appearance of contents was found for either the coffee or corn soup as contents, even after standing at 60° C. for 3 days and outdoors for 1 week.

Comparative Example 2

A barrier laminate was produced in the same manner as Example 1, except that in the light-shielding barrier laminate of Example 1, an aluminum vapor deposition film was used instead of the low-density polyethylene-based resin film.

The final multilayer structure was: PET film/aluminum oxide vapor deposition film/gas-barrier coated film/adhesive layer/low-density polyethylene-based resin film. Also, the oxygen permeability was 0.3 cc/m$^2$·day·atm and the water vapor permeability was 0.6 g/m$^2$·day·atm.

Furthermore, the contents were discolored both after standing at 60° C. for 3 days and outdoors for 1 week, with both the coffee and corn soup as contents.

In addition, the energy consumption was 68 and the carbon dioxide emission was 54, with the values for the laminate of Comparative Example 1 as 100.

[Evaluation]

The light-shielding barrier laminates of Examples 1 to 7 were two-layer structures exhibiting low LCA values, but they also exhibited high oxygen gas barrier properties, water vapor barrier properties and content resistance equivalent to the three-layer structure laminate of Comparative Example 1. In contrast, the laminate of Comparative Example 2 was inferior in terms of oxygen gas barrier property, water vapor barrier property and content resistance.

EXPLANATION OF SYMBOLS

1. Transparent resin film
2. Inorganic oxide vapor deposition film
3. Adhesive layer
4. Aluminum vapor deposition film
5, 5a, 5b. Heat-sealable resin films
6. Gas-barrier coated film A. Transparent gas barrier film
B. Light-shielding sealant film

The invention claimed is:

1. A light-shielding barrier laminate comprising:

a transparent gas barrier film; and a light-shielding sealant film laminated on the transparent gas barrier film via an adhesive layer, wherein the transparent gas barrier film comprises a transparent resin film and an inorganic oxide vapor deposition film formed on one side of the transparent resin film, the light-shielding sealant film comprises a heat-sealable resin film and a light-shielding aluminum vapor deposition film formed on one side of the heat-sealable resin film, the side of the heat-sealable resin film on which the aluminum vapor deposition film is formed faces the side of the transparent resin film on which the inorganic oxide vapor deposition film is formed via the adhesive layer, the aluminum vapor deposition film is formed by a vacuum vapor deposition method with a resistance heating system, and the transparent gas barrier film is a gas-barrier coated film made of a gas barrier composition comprising one or more alkoxides represented by the general formula $R^1{}_nM(OR^2)_m$ (where $R^1$ and $R^2$ are C1 to 8 organic groups, M is selected from silicon, zirconium, titanium, and aluminum, n is an integer of 0 or greater, m is an integer of 1 or greater, and n+m is the valency of M), and either or both a polyvinyl alcohol-based resin or an ethylene-vinyl alcohol copolymer, and obtained by polycondensation by a sol-gel method, further formed on the inorganic oxide vapor deposition film.

2. A light-shielding barrier laminate comprising:

a transparent gas barrier film; and a light-shielding sealant film laminated on the transparent gas barrier film via an adhesive layer, wherein the transparent gas barrier film comprises a transparent resin film and an inorganic oxide vapor deposition film formed on one side of the transparent resin film, the light-shielding sealant film comprises a heat-sealable resin film and a light-shielding aluminum vapor deposition film formed on one side of the heat-sealable resin film, the side of the heat-sealable resin film on which the aluminum vapor deposition film is formed faces the side of the transparent resin film on which the inorganic oxide vapor deposition film is formed via the adhesive layer, the aluminum vapor deposition film is formed by a vacuum vapor deposition method with a resistance heating system, and the heat-sealable resin film is made of two or more olefin-based resin layers.

3. A light-shielding barrier laminate according to claim 2, wherein the heat-sealable resin film is made of two or more olefin-based resin layers, at least one of which contains a polypropylene resin.

* * * * *